United States Patent Office 2,953,608
Patented Sept. 20, 1960

2,953,608

PROCESS FOR REMOVING ACETYLENE FROM ETHYLENE

Herbert B. Fernald, Pittsburgh, Pa., assignor to Gulf Research & Development Company, Pittsburgh, Pa., a corporation of Delaware No Drawing. Filed June 12, 1958, Ser. No. 741,453

2 Claims. (Cl. 260—667)

This invention relates to the selective removal of acetylene from a gas consisting essentially of ethylene. In the production of ethylene by cracking paraffinic hycarbons such as ethane, propane and the like, acetylene is produced. Although in the recovery of ethylene from cracked gases most of the acetylene may be removed by selectively hydrogenating the cracked gas in known manner prior to its processing in the ethylene recovery system, a small but significant amount of acetylene nevertheless remains to be recovered with the ethylene.

In many instances, acetylene is highly undesirable in the ethylene product obtained by cracking, especially when it is desired to employ the ethylene for the production of polymers.

It has now been discovered that the acetylene content of a gas consisting essentially of ethylene can be substantially reduced by passing said gas over a solid contact material comprising a copper oxide dispersed on an inert porous carrier at a temperature below 100° C. Thus, according to the invention, the acetylene content of ethylene can be substantially completely removed.

The solid contact material employed for the selective removal of acetylene in accordance with the invention is a copper oxide dispersed on an inert porous carrier. The carriers themselves are well known in the art and include such materials as silica gel, alumina, bauxite, pumice, diatomaceous earth and the like. It is essential for the purposes of the invention that the porous carrier be inert. If such porous materials as active cracking catalysts, e.g., acid treated bentonite and the like, are employed as carriers, undesirable side reactions such as polymerization and cracking of the charge stocks tend to take place.

The particle size of the carrier material which is not critical, is of any suitable size known to the art. For example, for fixed bed operations a carrier of 10 to 20 mesh average particle size is successfully employed; for fluidized bed operations a carrier of 50 to 200 mesh average particle size is used. Since it is desirable for the copper oxide to be highly dispersed, the porous carrier should have a relatively high surface area, say on the order of at least 100 square meters per gram as measured by the Brunauer-Emmett-Teller method, and preferably at least about 200 square meters per gram.

The copper oxide deposited on the carrier can be cupric oxide, cuprous oxide or mixtures of the two. In one method of obtaining copper oxide uniformly dispersed on the carrier, the carrier is impregnated with an aqueous solution of cupric nitrate followed by ignition to decompose the nitrate salt to cupric oxide. The contact can then be used as such or the cupric oxide thereon can be converted wholly or partially to cuprous oxide by treating the contact with an aqueous formaldehyde solution and then drying. Other suitable methods of preparing the contact can also be employed. The contact can contain between about 1 to 25 percent by weight of copper, calculated as the free metal, and preferably contains between about 5 to 15 percent by weight.

The process of selectively removing acetylene can be carried out under a relatively wide range of conditions of contact between the ethylene stream to be purified and the copper oxide impregnated carrier, provided that the temperature is below 100° C. Since selective removal of the acetylene takes place efficiently at normal ambient temperatures and pressures, these conditions are preferred. However, somewhat higher and lower temperatures, say from 0° to 90° C., can be employed. Since at higher temperatures the charge stock to be treated may be temperature sensitive leading to such reactions as polymerization, cracking and the like, it is desirable to maintain the contact temperature below 100° C. and preferably not higher than 50° C. The lower temperature limit is not critical, a temperature being selected which will give a sufficiently fast reaction rate between the copper oxide contact and the acetylene to be removed. Ordinary atmospheric pressures are generally employed, but pressures up to about 5000 pounds per square inch gauge or higher can also be used. Higher pressures than atmospheric tend to increase the rate of reaction between the copper oxide contact and the acetylene to be removed.

The contact time between the acetylene containing charge stock and the copper oxide impregnated carrier can vary between about 5 and 35 seconds, the lower contact times being employed at higher treating temperatures. For the preferred contact conditions of atmospheric temperature and pressure, a contact time between about 14 and 18 seconds is preferred.

The nature of the reaction between the copper oxide impregnated carrier and the acetylene is not fully understood, but it is presently believed that a copper acetylide is formed. However, it is possible that the acetylene may be polymerized and adsorbed on the copper oxide impregnated carrier. In any event, it has been demonstrated that, regardless of any theory as to how the acetylene is selectively removed, the copper oxide impregnated inert carriers efficiently and selectively removed acetylene from the ethylene.

When the copper oxide impregnated contact has become inactive for the further removal of acetylene, it can be readily regenerated by burning off with an oxygen containing gas, such as air. The burn-off temperature is controlled so as not to exceed about 650° C. This is accomplished by diluting the oxygen containing stream with nitrogen or other inert gas, particularly in the early stages of the burn-off. After burning off, the copper on the contact is in the form of cupric oxide and requires reduction if it is desired to employ cuprous oxide or a mixture of the latter with cupric oxide as the active material on the inert carrier.

A typical contact material suitable for the selective removal of acetylene from hydrocarbon mixtures is prepared as follows. Silica gel of 10 to 20 mesh having an average pore diameter of 23 Angstrom units and a surface area of about 500 square meters per gram is calcined by gradually raising the temperature over a period of 6 hours to 260° C. and then maintaining the temperature at 260° C. for 12 hours. A quantity, 847 grams of the calcined silica gel is then charged to a glass boiling flask and the pressure in the system is reduced to 6 mm. absolute pressure and held at that pressure for 30 minutes. Then an aqueous solution of copper nitrate [$Cu(NO_3)_2 \cdot 3H_2O$] containing 17.2 percent by weight of CuO is introduced slowly into the flask from a dropping funnel until the silica gel is completely submerged. After the silica gel has soaked in the copper nitrate solution for 15 minutes, the pressure in the flask is allowed to come to atmospheric pressure and held there for 10 minutes. The impregnated silica gel is removed from the flask and the excess solution is drained off. The impregnated silica gel is dried at 121° C. overnight and is then calcined at 538° C. for 10 hours. In the calcining operation, the copper nitrate is thermally decomposed to leave cupric oxide uniformly dispersed on the silica gel. The cupric oxide impregnated contact thus obtained is found to contain 10.23 percent by weight of copper and has a surface area of 442 square meters per gram. In the preparation of the above contact material, other inert carriers as disclosed herein and other copper salts, such as the acetate and formate, are also employed.

The following examples are further illustrative of the invention.

*Example I*

Ethylene containing 17.3 parts per million of acetylene is passed through a 200 cc. bed of the cupric oxide impregnated silica gel, prepared as just described above, at room temperature and pressure for a contact time of 15.6 seconds and a total throughput of 5000 cc. of the charge. The ethylene issuing as the product contains only 2.4 parts per million of acetylene.

*Example II*

Example I is repeated except that the temperature is increased to 70° C. and the contact time is increased slightly to 16.8 seconds. The product ethylene contains 3 parts per million of acetylene.

Similar results to those shown in the above examples are obtained using other copper oxide impregnated inert carriers.

The process of the invention is thus suited for the selective removal of acetylene from a gas consisting essentially of ethylene. The charge stocks successfully treated in accordance with the invention can contain substantial amounts of acetylene, on the order of 1 volume percent, as well as the relatively small deleterious amounts shown in the specific examples. The selective removal of acetylene in accordance with the present process is also advantageous in that it avoids the more severe processing conditions required in prior art processes and eliminates such extraneous treating agents as hydrogen.

Resort may be had to such modifications and variations as fall within the spirit of the invention and the scope of the appended claims.

I claim:

1. A process for the removal of acetylene from a gas consisting essentially of ethylene which comprises passing said gas over a solid contact material comprising a copper oxide dispersed on an inert porous carrier at a temperature between 0° and 90° C.

2. A process for the removal of acetylene from a gas consisting essentially of ethylene which comprises passing said gas over a solid contact material consisting of cupric oxide dispersed on silica gel at ambient temperatures and substantially atmospheric pressure.

References Cited in the file of this patent

UNITED STATES PATENTS 2,398,301    Frevel _____ Apr. 9, 1948